E. M. SAMMIS.
Lemon-Squeezers.
No. 142,414.            Patented September 2, 1873.
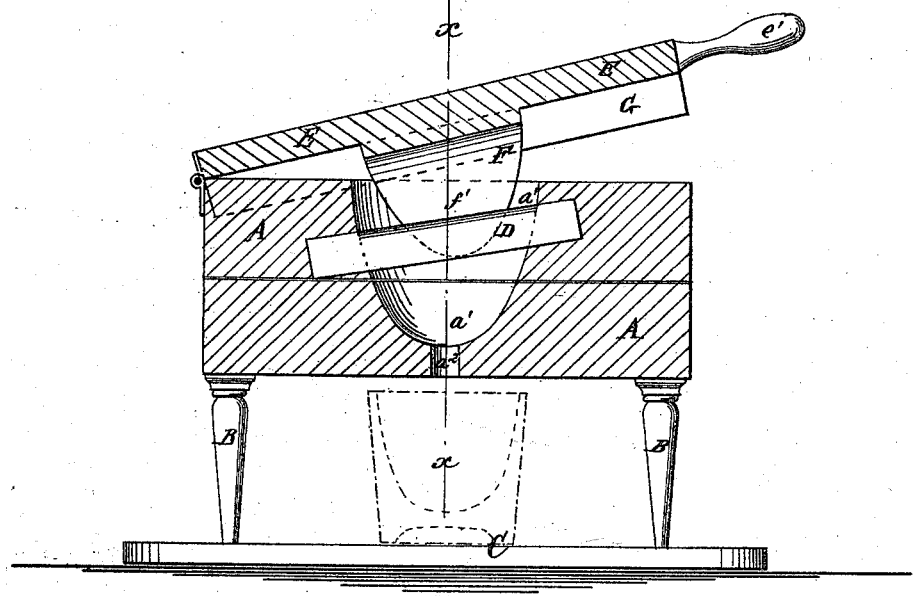
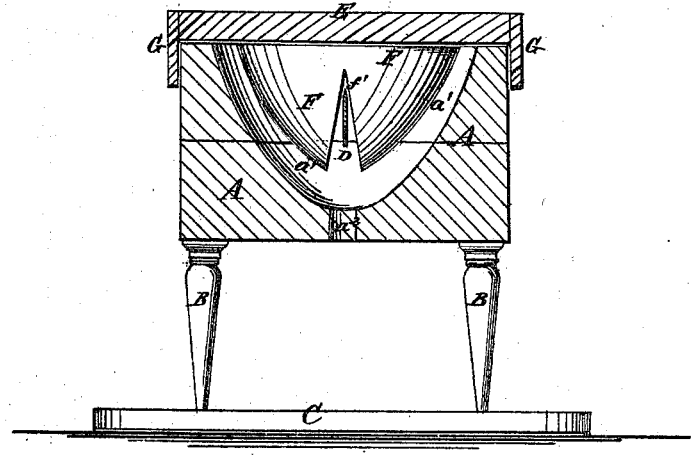
Witnesses:
A. W. Almqvist
C. Sedgwick
Inventor.
E. M. Sammis
Per   [signature]
Attorneys.

UNITED STATES PATENT OFFICE.

EDWARD M. SAMMIS, OF BABYLON, NEW YORK.

IMPROVEMENT IN LEMON-SQUEEZERS.

Specification forming part of Letters Patent No. 142,414, dated September 2, 1873; application filed July 19, 1873.

*To all whom it may concern:*

Be it known that I, EDWARD M. SAMMIS, of Babylon, in the county of Suffolk and State of New York, have invented a new and useful Improvement in Lemon-Squeezer, of which the following is a specification:

Figure 1 is a vertical longitudinal section of my improved lemon-squeezer. Fig. 2 is a vertical cross-section of the same taken through the line $x\,x$, Fig. 1.

Similar letters of reference indicate corresponding parts.

My invention has for its object to furnish an improved lemon-squeezer, which shall be so constructed that a whole lemon may be put into it and the juice expressed without its being necessary to first cut the said lemon, and which will prevent the juice from squirting out over the operator. The invention consists in the knife secured in the cavity of a lemon-squeezer; in the arrangement of the knife in the cavity of a lemon-squeezer in an inclined position; in the slit or notch formed in the knob or projection of a lemon-squeezer; and in the side flanges, in combination with the parts of a lemon-squeezer, as hereinafter fully described.

A represents the lower part of the squeezer, which is provided with legs B, of such a length that a tumbler or other receptacle to receive the juice can be placed beneath the said part A. C is a plate or platform secured to the legs B at their lower ends, or in such a position that a tumbler or other receptacle to receive the juice may be placed upon it and slipped in beneath the part A. In the upper side of the part A is formed a concavity, $a^1$, of such a size as to receive a whole lemon. In the concavity $a^1$ is secured a knife, D, to cut the lemon as it is pressed upon it. The knife D is placed in an inclined position, as shown in Fig. 1. The effect of the inclination of the knife D is to cause the lemon to roll downward, so as to be pressed against one side of the concavity $a^1$, and leave a space at the other side, so that the juice may flow out freely through the hole or holes $a^2$ formed in the part A, and leading down from the bottom or lower part of said cavity $a^1$. E is the upper part of the squeezer, which is hinged at one end to the end of the part A, and upon its other end is formed a handle, $e'$, by which the squeezer is operated. Upon the lower side of the part E is formed a knob or projection, F, in such a position as to enter the cavity $a^1$ of the part A. The projection F has a notch or slit, $f'$, formed in it to receive the knife D, so that the said projection may press the lemon down upon the knife D to cut it, and at the same time press the said lemon against the walls of the cavity $a^1$ and squeeze out the juice. The knife D and slit or notch $b'$ are designed to be so arranged as to not quite separate the parts into which the lemon is cut. Upon the side edges of the upper part E are formed flanges G, which overlap the side edges of the part A, and thus prevent the juice from squirting out upon the operator while squeezing the lemons. The knife D and the various parts of the machine are designed to be made of, or plated with, nickel or other metal that lemon-juice will not corrode.

The squeezer, while being used, is designed to be placed upon a table or counter.

Having thus described my invention, I claim as new and desire to secure by Letters Patent—

1. The knife D, secured in the cavity of a lemon-squeezer, substantially as herein shown and described.

2. The arrangement of the knife D, in the cavity of a lemon-squeezer, in an inclined position, substantially as herein shown and described.

3. The combination of the notched knob or projection F with the knife D, arranged as specified.

4. The flanges G, in combination with the parts A E of a lemon-squeezer, substantially as herein shown and described, and for the purpose set forth.

EDWARD M. SAMMIS.

Witnesses:
T. B. MOSHER,
ALEX. F. ROBERTS.